UNITED STATES PATENT OFFICE.

MAXIMILIAN RIEGEL, OF BERLIN, GERMANY, ASSIGNOR TO THE FIRM OF NAHRMITTEL-INDUSTRIE G. M. B. H., OF QUADRATH, NEAR COLOGNE, GERMANY.

PROCESS OF PRECIPITATING CASEIN.

SPECIFICATION forming part of Letters Patent No. 689,023, dated December 17, 1901.

Application filed December 31, 1900. Serial No. 41,733. (No specimens.)

*To all whom it may concern:*

Be it known that I, MAXIMILIAN RIEGEL, a subject of the King of Prussia, German Emperor, and a resident of 54 Perlebergerstrasse, Berlin, in the Kingdom of Prussia, German Empire, have invented a new and useful Process for the Precipitation of Casein, of which the following is an exact specification.

Hitherto for the precipitation of casein from milk by means of acid the following acids have been employed: acetic acid, lactic acid, sulfuric acid, and muriatic acid. Experience has shown that by means of the first-mentioned acid a product can be attained which is very poor in ash; but never a product can be attained containing less than 1.8 per cent. of ash. A great disadvantage of this precipitation of casein by means of acetic acid is the comparatively high price of this acid, so that most manufacturers prefer the employment of sulfuric acid, though the casein produced by this acid contains too much sulfate of calcium. In case of muriatic acid being used the precipitation of the casein is very difficult and requires complicated apparatus. Besides, it is difficult to remove all the muriatic acid, and even in case only a small quantity of the same remains in the casein this casein becomes very slimy.

In order to do away with these disadvantages, I provide my new process, consisting in precipitating the casein by means of an alkyl-sulfonic acid, as ethyl- or methyl-sulfonic acid. By means of these acids casein is attained in undecomposed and compact but not slimy state, which casein on account of the calcium ethyl-sulfonate being easily soluble is nearly free of ash. It suffices for the precipitation of the casein to employ a raw ethyl-sulfonic acid manufactured by thoroughly mixing equal quantities of concentrated sulfuric acid and strong alcohol and slightly heating this mixture for several hours. The price of the product so attained is essentially lower than that of the muriatic and of the lactic acid. On account of the alkyl-sulfonic acid being capable of killing the bacteria contained in the milk the precipitated liquid attained by my new process keeps very well and offers a casein which is perfectly free from germs.

Having thus fully described the nature of this invention, what I desire to secure by Letters Patent of the United States is—

1. Process for the precipitation of casein, consisting in precipitating the milk by means of alkyl-sulfonic acid, substantially as set forth.

2. Process for the precipitation of casein, consisting in precipitating the milk by means of ethyl-sulfonic acid, substantially as set forth.

In testimony whereof I have signed my name to this specification in the presence of two subscribing witnesses.

MAXIMILIAN RIEGEL.

Witnesses:
WOLDEMAR HAUPT,
HENRY HASPER.